Patented June 3, 1930

1,762,077

UNITED STATES PATENT OFFICE

BRUNO REWALD, OF HAMBURG, GERMANY

PRODUCTION OF EGG-YOLK SUBSTITUTES

No Drawing. Application filed March 12, 1929. Serial No. 346,488, and in Germany September 7, 1927.

For the production of many foodstuffs, particularly bakery and confectionery goods, pasteries and the like, fat and egg yolk are both used. These have hitherto been added separately. In place of fresh eggs, due to their relatively high price, use has been made preferably of liquid Chinese preserved egg yolk, which latter, however, is nevertheless not free from objection and especially in warm weather, it is liable to deteriorate.

The addition of egg yolk is effective mainly because of its lecithin content and because of the yellow colouring substance, i. e., the lutein, which it contains. Therefore it is possible to replace egg yolk by lecithin in the form in which it can be obtained in large quantities and at moderate prices from many animal and particularly vegetable substances, such as, for example, from soybeans. This has heretofore not been successfully accomplished, however, due to the fact that these phosphatides can be brought into aqueous emulsion only with difficulty and are then apt to soon decompose, for which reason they are quickly destroyed and must be treated with caution. Preservation is hardly possible because all acids, such as boric acid, benzoic acid and also their salts, destroy the emulsion.

I have now found that an emulsion of lecithin which is of a very durable character and may be employed as a substitute for egg yolk and fat can be produced by emulsifying lecithin with suitable food fats, for example butter, margine, lard or the like, in such quantities containing at least 5% of the food fat that the emulsion contains at the same time the quantities of fat and egg yolk substances in the correct proportion requisite for the production of the food substance so that both constituents need no longer be added separately as hitherto.

The addition of lecithin to margarine for the purpose of increasing its similarity to butter is, it is true, well known. In this connection, however, it is a question of only extremely small fractional quantities of a few thousandths gramme, in order to give the margarine a content of lecithin equal to butter of lecithin. These small quantities have as their chief purpose, to give foaming and browning. No physiological nutrient value can be attributed to them. It could not under any circumstances have been foreseen, however, that a mixture of fat containing lecithin to so high a degree as is employed in the present case would be durable in spite of the relatively large quantities of water present therein.

*Example I.*—For carrying the process into effect by way of example 900 gr. of butter and 100 gr. of soy-lecithin which latter has been purified (without using organic solvents), are mixed and intimately kneaded in cold condition. The butter mixture thus obtained is equivalent to about 25 egg yolks or 400 gr. of fresh egg yolk.

*Example II.*—In a similar way 800 gr. margarine are emulsified with 200 gr. lecithin in a cold or warm condition. This emulsion is equivalent to about 50 egg yolks or 800 gr. of fresh egg yolk.

I claim:—

Egg yolk substitute from fat and phosphatides consisting of a stable emulsion of food fats with about 5–20% of lecithin.

In testimony whereof I affix my signature.

DR. BRUNO REWALD.